United States Patent
Panattu et al.

(10) Patent No.: US 9,755,789 B2
(45) Date of Patent: Sep. 5, 2017

(54) SYSTEMS AND METHODS FOR DYNAMIC PACKET DUPLICATION IN A NETWORK

(71) Applicant: RingCentral, Inc., Belmont, CA (US)

(72) Inventors: Santosh Panattu, San Jose, CA (US); Patrice Khawam, San Francisco, CA (US)

(73) Assignee: RINGCENTRAL, INC., Belmont, CA (US)

( * ) Notice: Subject to any disclaimer, the term of this patent is extended or adjusted under 35 U.S.C. 154(b) by 0 days.

(21) Appl. No.: 14/947,400

(22) Filed: Nov. 20, 2015

(65) Prior Publication Data

US 2017/0149535 A1    May 25, 2017

(51) Int. Cl.
  H04L 1/18    (2006.01)
  H04L 29/06    (2006.01)
  H04L 12/26    (2006.01)

(52) U.S. Cl.
  CPC .......... H04L 1/189 (2013.01); H04L 43/0829 (2013.01); H04L 65/4069 (2013.01); H04L 65/80 (2013.01)

(58) Field of Classification Search
  None
  See application file for complete search history.

(56) References Cited

U.S. PATENT DOCUMENTS

| | | | |
|---|---|---|---|
| 7,362,707 B2 | 4/2008 | McLampy et al. | |
| 7,742,499 B1* | 6/2010 | Erskine | H04L 12/5695 370/352 |
| 8,238,287 B1* | 8/2012 | Gopi | H04L 41/0816 370/328 |
| 8,937,941 B1 | 1/2015 | Vendrow et al. | |
| 2001/0012993 A1* | 8/2001 | Attimont | G10L 19/005 704/200.1 |
| 2003/0126238 A1* | 7/2003 | Kohno | H04L 1/0009 709/220 |
| 2004/0073690 A1* | 4/2004 | Hepworth | H04L 12/2602 709/230 |
| 2004/0160979 A1* | 8/2004 | Pepin | H04L 1/0009 370/462 |
| 2007/0211631 A1* | 9/2007 | Rahman | H04L 69/164 370/230 |
| 2008/0137552 A1* | 6/2008 | Lee | H04L 41/5032 370/252 |
| 2011/0142034 A1* | 6/2011 | Wu | H04N 21/2343 370/352 |
| 2011/0235542 A1* | 9/2011 | Li | H04L 1/20 370/252 |

(Continued)

*Primary Examiner* — Faruk Hamza
*Assistant Examiner* — Cassandra Decker
(74) *Attorney, Agent, or Firm* — Finnegan, Henderson, Farabow, Garrett & Dunner, LLP (57) ABSTRACT

Systems and methods are provided for facilitating communication sessions between endpoints over one or more networks. In one implementation, a method includes receiving, by at least one processor, first data indicating that a communication session has been initiated to at least one endpoint. The method also includes receiving, by the at least one processor, second data corresponding to one or more application level metrics associated with the communication session and determining, by the at least one processor, during the communication session, based on the second data, a packet duplication model for transmitting one or more data packets over one or more networks.

23 Claims, 7 Drawing Sheets

(56) References Cited

U.S. PATENT DOCUMENTS

2013/0294239 A1* 11/2013 Szabo .................... H04L 47/10
370/235
2014/0105033 A1 4/2014 Vasseur et al.

* cited by examiner

| Network Metric | Weight(%) | Possible Value |
|---|---|---|
| Bandwith | 15 | if bandwidth=128kbps, value=1<br>if bandwidth=2Mbps, value=2<br>if bandwidth>2Mbps, value=3 |
| type | 1 | if wifi, wimax, ethernet, 4g, value=3<br>if other, value=0 |
| Jitter | 5 | if jitter<10ms, value=3<br>if jitter<40ms, value=2<br>if jitter<60ms, value=1 |
| Latency | 10 | if latency<20ms, value=3<br>if latency<50ms, value=2<br>if other, value=0 |
| Packet loss | 10 | if packet loss<5, value=3<br>if packet loss<10, value=2<br>if packet loss<15, value=1<br>if other, value=0 |
| Carrier | 5 | if AT&T,Comcast, value=3<br>if Sprint, T-Mobile, value=2<br>if other, value=0 |

← 401

| Device Metric | Weight(%) | Possible Value |
|---|---|---|
| OS | 2 | if iOS, value=3<br>if Android, Win, value=2<br>if Linux or other, value=1 |
| Model | 8 | if iPhone5/6, Nexus5/6, S5/6, value=3<br>if iPhone4s, S4, value=2<br>if other, value=0 |
| CPU | 10 | if iPhone & CPU >=1.4G, value=3<br>if Android & CPU>=2G, value=3<br>if Win&CPU>=2G, value=3<br>if other, value=0 |
| RAM | 5 | if RAM>=800M, value=3<br>if other, value=0 |

← 402

| Server Metric | Weight(%) | Possible Value |
|---|---|---|
| Codec | 15 | if opus, value=3<br>if G.722, value=2<br>if G.711, value=1<br>if iLBC,G.729, value=0 |
| Media server location | 5 | if same location with endpoint, value=3<br>if other, value=0 |
| Call Type | 5 | if domestic, value=3<br>if international, value=1 |

| Network Metric | Weight(%) | Value | Score |
|---|---|---|---|
| Bandwith | 15 | 3 | 45 |
| Type | 1 | 1 | 1 |
| Jitter | 5 | 3 | 15 |
| Latency | 10 | 2 | 20 |
| Packet loss | 10 | 3 | 30 |
| Carrier | 5 | 3 | 15 |

◄— 501

| Device Metric | Weight(%) | Value | Score |
|---|---|---|---|
| OS | 2 | 3 | 6 |
| Model | 8 | 3 | 24 |
| CPU | 10 | 3 | 30 |
| RAM | 5 | 3 | 15 |

◄— 502

| Server Metric | Weight(%) | Value | Score |
|---|---|---|---|
| Codec | 15 | 3 | 45 |
| Media server location | 5 | 3 | 15 |
| Call Type | 5 | 3 | 15 |

SYSTEMS AND METHODS FOR DYNAMIC PACKET DUPLICATION IN A NETWORK

TECHNICAL FIELD

The present disclosure relates generally to managing network services and, more specifically, to duplicating packets for multimedia communication services in communication systems.

BACKGROUND

Network services using real-time delivery of multimedia data over a network have become ubiquitous. For example, packet-based telephony service, such as voice-over-IP ("VoIP") telephony, typically includes the real-time delivery of voice, and other multimedia data types, such as video data, on a network using Real-Time Transport Protocol (RTP) to exchange information that controls the delivery of data. The perceived quality of VoIP telephony service can be determined by various parameters affecting the real-time delivery of the data over the network, such as network conditions, and the network resources allocated for the delivery of the data.

Various conditions along the network may adversely affect the real-time delivery of multimedia data throughout a network. For example, network congestion and the capacity of various components along the network, including the endpoints, may impact performance. In systems using VoIP technology, voice and video signals are converted into network packets, which may be transported via a variety of suitable Internet Protocol (IP) based protocols. When data is transferred via packets in accordance with the IP-based protocols, certain packets may be dropped, for example, due to network congestion at a router or link in the transmission pathway that may receive packets at a greater rate than it is capable of transmitting the packets. This packet dropping may result in a loss of information and a decreased user-perceived quality of service. While certain traffic duplicating systems have been developed to address these problems, many such systems operate based on data sourced from only the protocol level. Therefore, systems and methods are needed to address one or more of these drawbacks of conventional systems.

SUMMARY

Presently disclosed embodiments are directed to communication systems and methods therefor for dynamic packet duplication in a network.

In one embodiment, a computer-implemented method includes receiving, by at least one processor, first data indicating that a communication session has been initiated to at least one endpoint. The method also includes receiving, by the at least one processor, second data corresponding to one or more application level metrics associated with the communication session. The method further includes determining, by the at least one processor, during the communication session, based on the second data, a packet duplication model for transmitting one or more data packets over one or more networks.

In another embodiment, a system for facilitating communication sessions between endpoints includes at least one memory device storing computer-executable instructions at least one processor configured to execute the stored instructions to receive first data indicating that a communication session has been initiated to at least one endpoint. The processor is further configured to execute the stored instructions to receive second data corresponding to one or more application level metrics associated with the communication session and to determine, based on the second data, a packet duplication model for transmitting one or more data packets over one or more networks.

In another embodiment, a non-transitory computer-readable medium stores instructions executable by at least one processor to facilitate communication sessions between endpoints according to a method. The method includes receiving first data indicating that a communication session has been initiated to at least one endpoint, receiving second data corresponding to one or more application level metrics associated with the communication session, and determining, during the communication session, based on the second data, a packet duplication model for transmitting one or more data packets over one or more networks.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

As described in more detail below, the disclosed embodiments are directed to duplicating packets in a communication system based on one or more dynamically changing (e.g., throughout a communication session) application level metrics. An application level metric may include any operational network metric, including, but not limited to metrics associated with the network for the communication session (e.g., bandwidth, jitter, latency, packet loss, etc.), metrics associated with the device(s) for the communication session (e.g., operating system, device model, etc.), metrics associated with server for the communication session (e.g., media server location, call type, etc.). More specifically, the disclosed embodiments provide systems and methods for dynamically duplicating packets according to a packet duplication model. The packet duplication model may provide parameters defining the duplication, including but not limited to a packet duplication rate, percent, interval, and/or frequency. Further, the packet duplication model may be based on one or more inputs including, but not limited to, quality of service (QoS) data gathered or determined in real-time during a communication session, statistical data from prior communication sessions and/or prior time points (i.e., time points earlier than a time point at which the current data is acquired) in given communication session, and changes to such data during the communication session. In some embodiments, after a packet duplication model has been determined, the disclosed systems and methods may communicate the packet duplication model to an endpoint. In some embodiments, the packet duplication model may be transmitted, for example, via RTP control protocol (RTCP) application packets over a media control channel to enable selective duplication of the packets during the communication session in accordance with the determined packet duplication model.

Further, in some embodiments, the disclosed systems and methods dynamically generate suitable packet duplication models during the communication session by continuously receiving data corresponding to application level metrics. The application level metrics may be indicative of a quality of service (QoS) experienced by an end user, such as a participant on an audio phone call. Further, as the application level metrics may change during a communication session, the disclosed systems and methods may adapt to changed conditions. In some embodiments, the dynamic generation of a packet duplication model may include recalibrating a prior determined packet duplication model based on updates and/or changes to the application level metrics. For example, a packet duplication model may be determined prior to initiating a communication session, and changes to the packet duplication model may be made throughout the communication session to recalibrate the packet duplication model as one more application level metrics change.

In some embodiments, "dynamically generating" the packet duplication model may include generating the packet duplication model throughout a communication session or during at least a portion of a communication session. That is, in some disclosed embodiments, a given packet duplication model may be updated during the communication session.

The foregoing features provide several advantages over traditional systems and methods that do not use packet duplication or that use static, predefined packet duplication methods that remain invariably persistent throughout a communication session. For example, systems and methods disclosed herein may dynamically generate a packet duplication model based on application level metrics that account for one or more characteristics of a communication session while the session is ongoing. The adaptive nature of the disclosed embodiments may enhance communication and decrease unnecessary network traffic. These and other features of the disclosed embodiments are described in more detail below.

Reference will now be made in detail to methods and specific implementations that seek to address the drawbacks of current systems discussed above. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as provided by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The example embodiments disclosed herein include computer-implemented methods, non-transitory computer-readable mediums, and systems. The computer-implemented methods may be executed, for example, by at least one processor of a server that executes instructions stored in a non-transitory computer-readable storage medium. As used herein, a non-transitory computer-readable storage medium includes various types of memory, for example, a flexible disk, hard disk, solid state drive, magnetic tape, or any other magnetic data storage medium, a CD-ROM, any other optical data storage medium, a RAM, a PROM, and EPROM, a FLASH-EPROM or any other flash memory, NVRAM, a cache, a register, any other memory chip or cartridge, and networked versions of the same. Singular terms, such as "memory" and "computer-readable storage medium," can additionally refer to multiple structures, such a plurality of memories or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with the embodiments described herein. Additionally, one or more computer-readable storage mediums may be used to implement a computer-implemented method. The term "computer-readable storage medium" should be understood to include tangible items and exclude carrier waves and transient signals.

Figure 1:
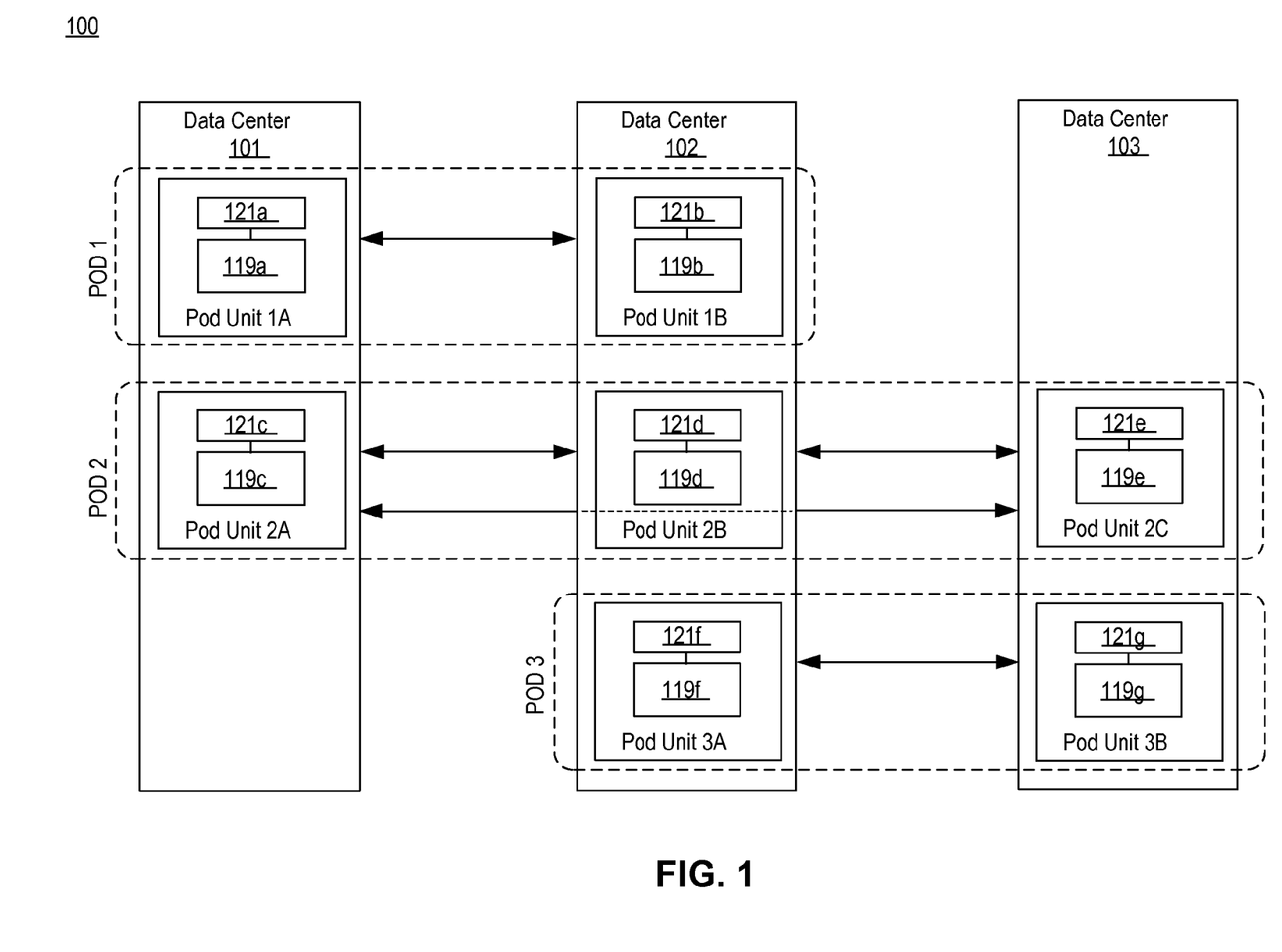
FIGS. 1 and 2 are diagrams of example communication systems in which various implementations described herein may be practiced.

FIG. 1 depicts an example of a communication system 100 in which the disclosed embodiments for dynamic packet duplication may be implemented. System 100 may include, for example, a telephony system such as a hosted Private Branch Exchange (PBX) platform that provides voice and video over IP, fax services, etc. In some examples, one or more components of communication system 100, such as data centers 101, 102, and 103, may be used to implement computer programs, applications, methods, processes, or other software to perform the described packet duplication methods and to realize the structures described herein.

As shown in FIG. 1, communication system 100 includes data centers 101, 102, and 103. Each data center may constitute a point of presence (POP) that includes one or more network computing resources (e.g., servers, routers, switches, network connections, storage devices, etc.) for supporting the services provided by communication system 100. For example, one or more of the data centers 101, 102, and 103 may include a server for dynamically duplicating packets according to a packet duplication model. In some embodiments, each data center may be located in a different geographical region.

In the example embodiment depicted in FIG. 1, communication system 100 includes three user points of data referred to as performance optimized datacenters (or pods), i.e., pods 1, 2 and 3, each of which may be a logical grouping of two or more pod units situated in different data centers. In other embodiments, the number of pods may be greater or fewer, depending on implementation-specific considerations. Each pod may serve a different subset of user accounts. In one example, each pod unit (e.g., unit 2A) may serve the same subset of users as the other pod units within the same pod (e.g., pod units 2B and 2C). Each pod unit may include a communication server 119a-d configured to provide substantially the same services to the same subset of users as the other pod units within the same pod.

Each pod unit may also include an account database 121a-121g configured to support the respective communication servers for its corresponding subset of users. It should be noted that the term "user" may refer to any of a variety of entities that may be associated with a subscriber account such as, for example, a person, an organization, an organizational role within an organization, a group within an organization, etc. As described in more detail below, one or more of communication servers 119a-d may be configured to implement one or more of the packet duplication methods disclosed herein.

Figure 2:
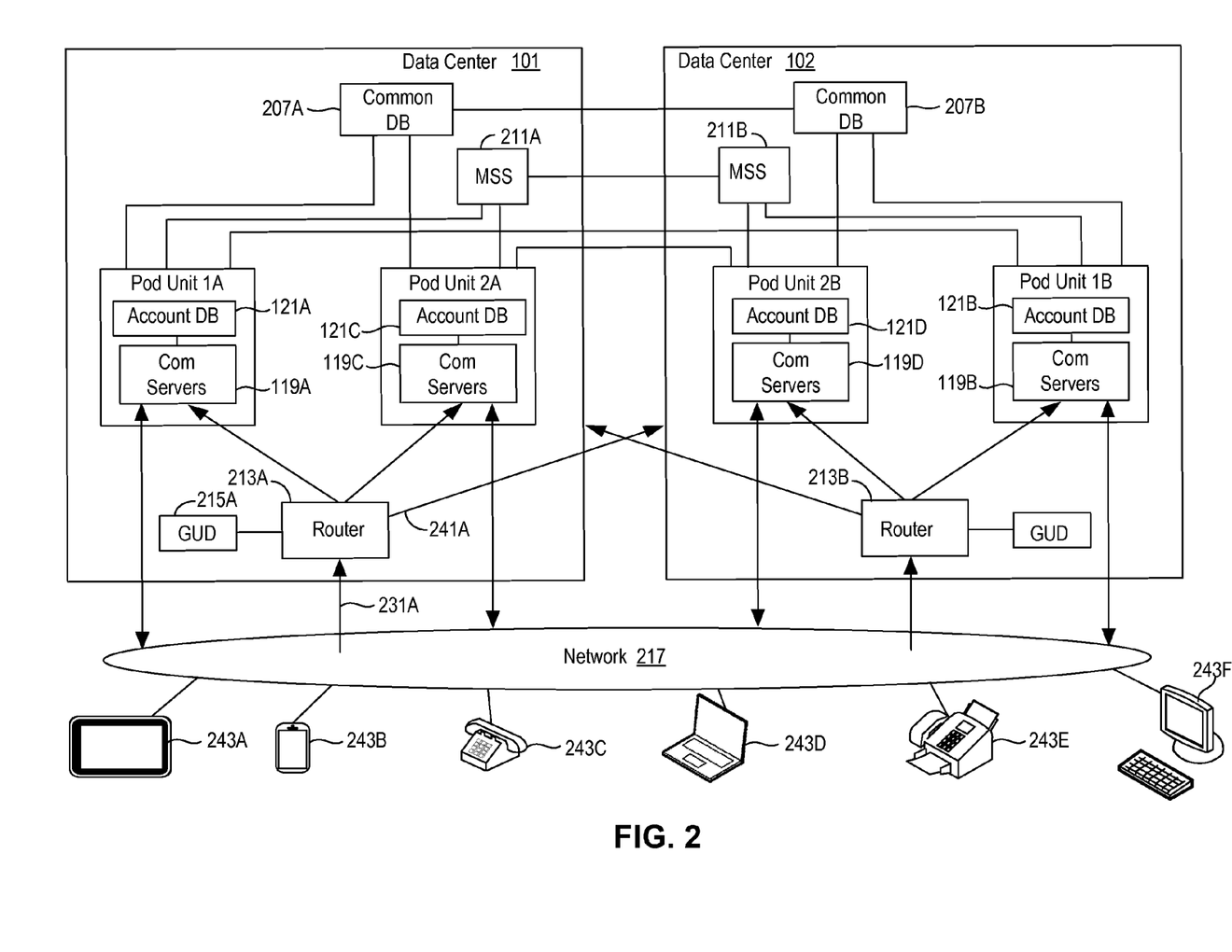

FIG. 2 illustrates various components of communication system 100. In some examples, one or more components of communication system 100, such as data centers 101 and 102, and/or communication endpoints 243A-243F may be used to implement computer programs, applications, methods, processes, or other software to perform packet duplication methods described herein. Specifically, FIG. 2 shows various interconnections within and between data centers 101 and 102. For example, both data centers 101 and 102 are in communication with a network 217. Service requests from various communication endpoints 243A-243F may be routed through network 217 to either or both of the data centers. Communication endpoints 243A-243F may represent a diversity of client devices that connect with a services system designed in accordance with one or more implementations, as described herein. Such client devices may include, for example, cell phones, smart phones, tablets, laptop and desktop computers, conventional telephones, VoIP phones, teleconferencing devices, videoconferencing devices, set top boxes, gaming consoles, etc. Reference to specific client device types should, therefore, not be used to limit the scope of the present disclosure.

Data center 101 includes pod units 1A and 2A, a common database (CDB) 207A, a message storage system (MSS) 211A, a router 213A, and a global user directory (GUD) 215A. Additional pod units (not shown) may also be included in data center 101. Data center 102 is similarly configured and includes components that may operate substantially the same as those in data center 101. In some embodiments, data centers 101 and 102 may provide backup and redundancy to one another in the event of failure.

Communication servers 119A-D may provide multimedia services (e.g., VoIP, video, email, and/or facsimile) to subsets of users. Each one of communication servers 119A-D may also provide other services including, for example, user account management and configuration, billing services, accounting services, etc. As described in more detail below, communication servers 119A-D may provide network resources in response to receiving a service request 231A (e.g., a HTTP request, a SIP request, a RTP request, etc.) routed from router 213A. The network resources may be provided for the signaling and controlling of a multimedia communication session (e.g., a RTP session).

The network resources may also process multimedia communication sessions. The processing may include, for example, buffering incoming data packets in a queue before processing the packets, transcoding audio packets using different codecs to reduce the size of audio packets in view of network conditions, adding application-specific effects to the audio data (e.g., by adding a dial-tone to mimic a telephone call), etc. Each pod unit may also include an account database (e.g., account database 121A) to support the communication server(s) for that particular pod unit, storing configuration details and other information regarding each user's account.

Pod units 1A and 1B may communicate with one another so that the data on their respective account databases are synchronized across data centers. For example, data center 101 may include router 213A to receive incoming service request 231A from network 217. Router 213A may parse the incoming service request to identify or extract a user key, which can be any data or data sequence used to identify a user. The incoming service may also include other information. For example, the incoming service request may include a Session Initiation Protocol (SIP) request, which may include a telephone number of the called party, and router 213A may parse the service request to extract the telephone number. From the telephone number, router 213A may determine, for example, a geographical location associated with the service request.

Using information extracted from an incoming service request, router 213A may query GUD 215A to determine which pod is associated with the user key and/or with the geographical location. Depending on the querying result, router 213A may route the service request to data center 101, or another data center (e.g., data center 102 as indicated by arrow 241A).

Each pod unit of the data center 101 may also be coupled to MSS 211A. MSS 211A may store data (e.g., files) associated with the users served by pod units 1A and 2A. The stored data may include, for example, messages (e.g., voicemails and facsimiles), user logs, system messages, system and user call prompts (e.g., auto-attendant or user-recorded greetings), and other types of call-related or electronic messages. The contents of MSS 211A may be synchronized with other data centers (e.g., synchronized with MSS 211B of data center 102).

In some embodiments, data centers 101 and 102 may be configured to provide a predetermined quality of service for a multimedia session. The multimedia session may be an audio or voice session, a video session, a mixed media session, or any other type of multimedia session known to one of ordinary skill in the art. During the multimedia session, one or more data packets may be exchanged, for example, between at least two of the communication endpoints 243A-243F, with each data packet carrying data relevant to the type of multimedia session (e.g., an audio session may include audio or voice information in the data packets). For example, when a VoIP telephony service is provided, data centers 101 and 102 may provide a predetermined quality of VoIP telephony service between at least two of communication endpoints 243A-243F as data packets are exchanged between the endpoints. The quality of the VoIP telephony service may be defined as a measurable level of telephony service delivered to the communication endpoints 243A-243F, and may depend on system and/or network configuration characteristics. Further, the quality of the service may be affected by various metrics, such as digital signal processing capability of one or more communication servers 119A-D, performance of various network elements such as routers 213A-B, etc.

Additionally, network 217 may contribute to certain probability of packet loss, latency (or latency variation), jitter, burstiness of loss, etc., which may be determined by standards (e.g., LTE, 3G, etc.) and/or protocols (e.g., TCP/IP, ATM, etc.) associated with network 217. Moreover, the physical distances from data centers 101 and 102 to the communication endpoints 243A-243F may further exacerbate packet loss and latency when the data packets are routed over a long distance (e.g., hundreds of miles, thousands of miles, etc.) and/or through a large number of network elements. Furthermore, the processing capacity of communication servers 119A-D, as well as communication endpoints 243A-243F, may affect the speed of processing of the data packets transmitted through network 217. One or more of the aforementioned properties may contribute to a data packet loss rate and/or perceived latency in transmission of audio and/or video data, which in turn may affect the perceived quality of the VoIP telephony service. In some embodiments, the perceived quality of the VoIP telephony service may be estimated by one or more processors, for example, based on one or more application level metrics that may change throughout a communication session. For instance, in certain embodiments, the server in one or more of data centers 101-103 may perform this estimation.

Audio and video information is typically digitized and compressed with a particular codec into data packets for transmission over network 217. As described above, communication servers 119A-D may transcode audio data using different codecs (i.e., devices or programs capable of encoding or decoding a digital signal). In some embodiments, a codec may be selected based on a tradeoff between quality and bandwidth requirements. For example, the G.729 codec operates at a lower bit rate and has low network bandwidth requirement, but offers reduced audio quality as compared to, for example, the G.711 and G.722 codecs, which operate at higher bit rates and offer better audio quality but also have higher network bandwidth requirements. Also, the G.729 codec is typically more computation intensive than the G.711 and G.722 codecs. Based on the available network bandwidth and computation power, communication servers 119A-D may be configured to switch between codecs as they process the audio data packets.

Communication servers 119A-D may be configured to implement certain queue management policies. For example, communication servers 119A-D give priority to certain data packets and/or drop low-priority data packets when the queue depth reaches a certain level. Further, communication servers 119A-D may include one or more servers configured to dynamically determine a packet duplication model throughout a communication session. The use of a packet duplication model increases the likelihood that a greater number of data packets reach their destination, which results in a higher QoS for the end user.

Moreover, data centers 101 and 102 may be configured to provide a pre-determined quality of VoIP telephony service for a particular user device. For example, a user who operates one of communication endpoints 243A-243F may subscribe to a specific calling plan under which the user is to be provided with a pre-determined quality of VoIP telephony service. Based on the calling plan, a certain cost may be allocated to provisioning the subscribed service. The calling plan and cost information may be part of user account information stored, for example, in account databases 121a-d. This information may be accessed by the server and taken into account when determining an appropriate packet duplication model. For example, the server may recalibrate the packet duplication model throughout a communication session until an estimated QoS consistent with the user's plan is achieved.

Figure 3:
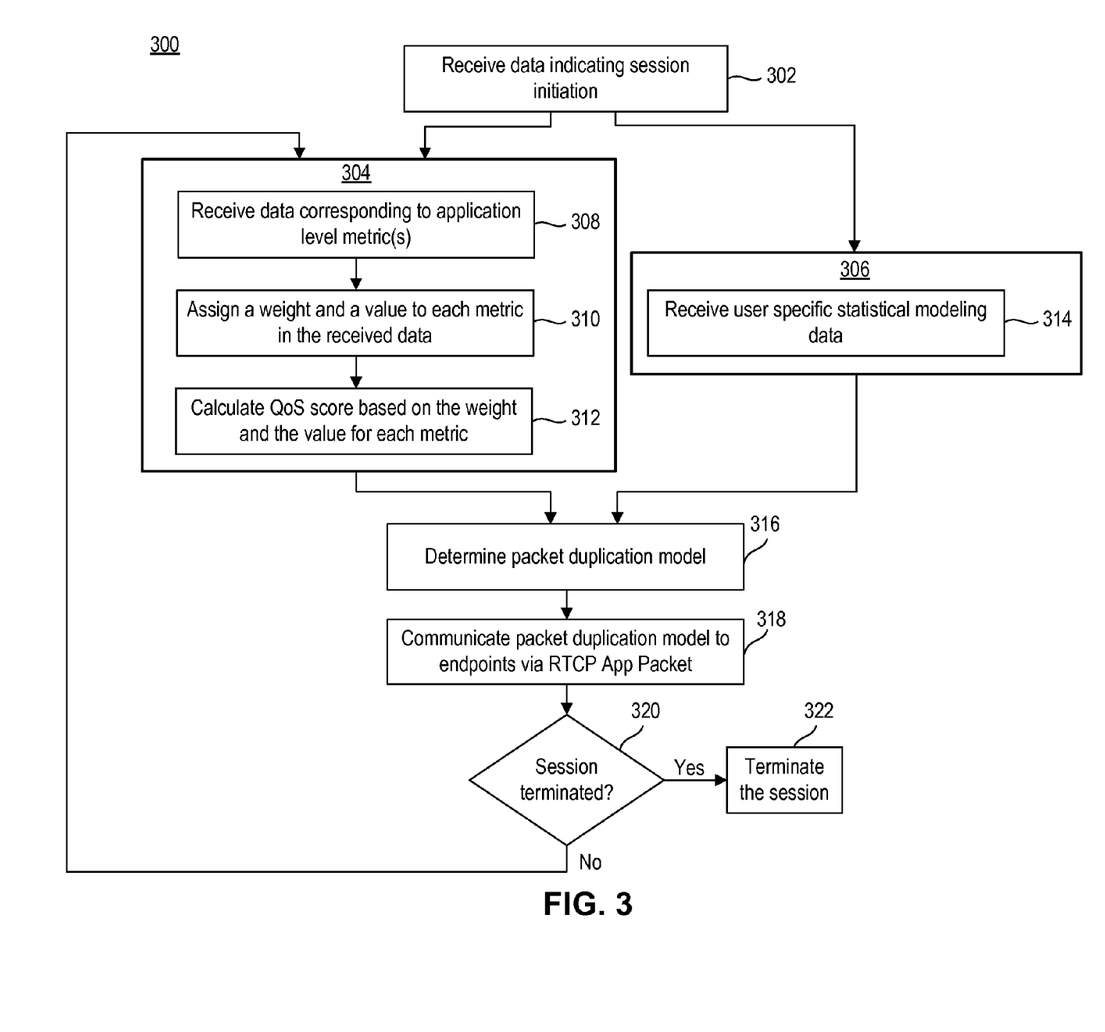
FIG. 3 is a flow chart illustrating an example of a method for dynamically duplicating packets in a network, consistent with disclosed embodiments.

In some embodiments, it may be desirable to increase or manage the QoS experienced by an end user by managing packet duplication model during a communication session. FIG. 3 is a flow chart illustrating an example of a packet duplication method 300 that a server located, for example, in one or more of data centers 101-103, may use to dynamically determine a packet duplication model, during at least a portion of a communication session. In some embodiments, the packet duplication model may include a change to a prior packet duplication model.

Method 300 may begin by receiving data indicating that a communication session has begun. For example, the processor implementing method 300 may receive information indicating that one or more of communication endpoints 243A-243F has entered into a communication session (block 302).

Next, method 300 may gather data from a dynamic metric pathway (block 304) and/or gather data from a statistical pathway (block 306). Blocks 304 and 306 may be executed either in parallel or series, depending on implementation-specific considerations, such as the available memory capacity and the desired response rate of the packet duplication model. Dynamic metric pathway 304 may be executed to obtain data related to non-static application level metrics, for example, from one or more layers of the Open Systems Interconnection (OSI) stack, as such metrics may dynamically change throughout the communication session. The statistical pathway may be executed to access prior stored information (e.g., information stored on a machine-readable medium associated with the packet duplication server) that may aid in determining a packet duplication model.

More specifically, executing the dynamic metric pathway 304 may include receiving data corresponding to one or more application level metrics (block 308). In some embodiments, the application level metric is gathered from one or more OSI layers. This data is gathered, for example, from one or more of the application layer, the presentation layer, the session layer, the transport layer, the network layer, the data link layer, and the physical layer. Further, the data gathered at block 308 may include, for example, network metrics, device metrics, server metrics, and/or other suitable metrics that may remain static or dynamically change through the communication session. Specific examples are discussed in more detail below with respect to FIG. 4. In some embodiments, suitable metrics gathered at blocks 306 and 308 may include an access interface used by the user (e.g., Wifi, 4G, 3G, 2.5G, fixed Ethernet), a codec used by the user for a call (e.g., G.711, G.722, G.729, OPUS, etc.), packet loss observed by the user, jitter or inter-packet delay, model of packet drops, percentage of lost packets, a type of multimedia session (e.g., conference call, video conference, one-on-one voice call, etc.), or any other suitable metric, including dynamic metrics that may change during the communication session.

Executing the dynamic metric pathway 304 may further include assigning a weight and/or a value to each received metric (block 310). The weight and value assigned to each metric are selected, for example, based on predetermined implementation-specific considerations. For instance, the weight is determined by estimating the relative importance of the metric to the overall QoS experienced by the user(s) for the given type of communication session. Executing the dynamic metric pathway 304 can also include calculating a QoS score based on the weight and value determined for each metric (block 312).

Executing the statistical pathway 306 concurrently or in series (before or after) with the dynamic metric pathway 304 may include additional steps. However, in the presently described embodiment, executing the statistical pathway 306 includes receiving, by the server, user-specific statistical modeling data (block 314). The user-specific statistical modeling data includes, but is not limited to, statistical data regarding connectivity, geographical location, or customer account specific information. This user-specific statistical modeling data may further include historical data corresponding to past successful packet duplication models associated with, for example, a particular user, location, connection type, etc. In this way, user-specific statistical modeling data corresponding to prior packet duplication models may be accessed to facilitate selection of the packet duplication model for a given communication session.

In the presently described example, one or more of the data centers 101-103, for example, via a server, in system 100 uses the outputs from the dynamic metric pathway 304 and/or the statistical pathway 306 to determine a packet duplication model for a communication session (block 316). The packet duplication model includes a packet duplication rate (i.e., a rate at which the packets are duplicated over a channel) and/or a packet duplication interval between packet transmission.

After system 100 determines an initial packet duplication model, it is communicated to the desired communication endpoints 243A-243F via data packets produced via a software application using RTCP (block 318). The communication endpoints 243A-243F duplicate data packets being communicated between two or more of the endpoints 243A-F in accordance with the determined packet duplication model. By implementing the proposed packet duplication model, a greater number of packets will be successfully communicated between the endpoints 243A-F since there is an increased likelihood that dropped packets will be duplicated, thus reaching their desired destination. Accordingly, the voice and/or video quality of the communication session may be improved.

Further, method 300 determines whether the session has terminated (block 320) and, if the communication session is ongoing, method 300 may return to block 308 to continue to monitor QoS changes throughout the communication session. Responsive to dynamic changes to the application level metrics, method 300 includes the step of regenerating a packet duplication model (e.g., by recalibrating the previously generated packet duplication model) at block 316 to account for the operational changes. The foregoing feature may offer one or more advantages over systems that use pre-determined packet duplication methods due to the increased responsiveness to the real-time changing metrics throughout the communication session. Once the packet duplication model is updated at block 316, method 300 may include re-inquiring as to whether the communication session is ongoing and, if not, terminates the session (block 322).

Figure 4:
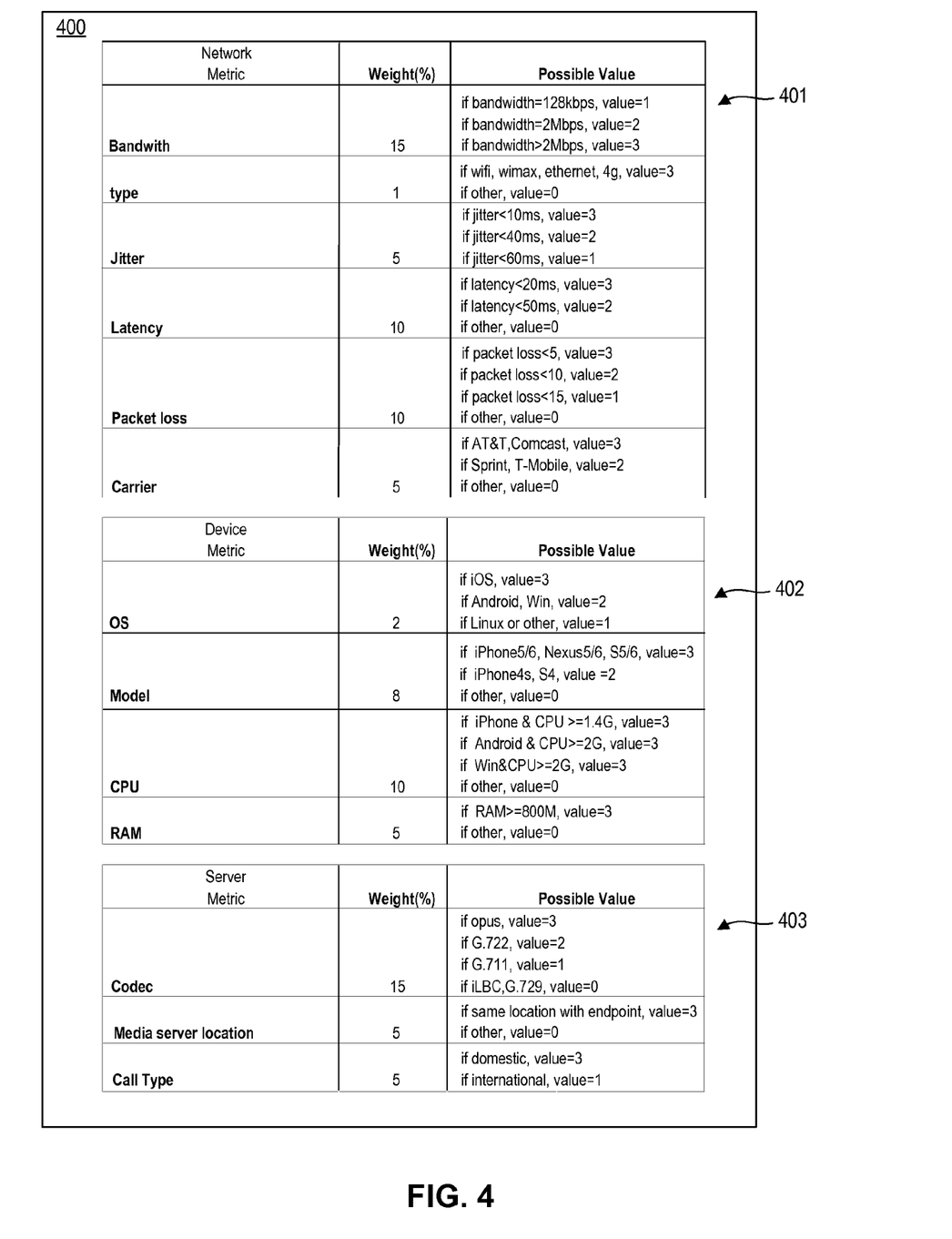
FIG. 4 is an example of a data structure for storing application level metrics, consistent with disclosed embodiments.

Reference is now made to FIG. 4, which depicts a data structure 400 for storing a set of application level metrics, along with their associated weights and values, in accordance with one example embodiment. As shown in FIG. 4, data structure 400 includes tables 401, 402, and 403. Table 401 associates a set of application level network metrics with a weight and a set of corresponding values, with each value associated with a certain level of network performance measured by the network metrics. The value may reflect a predicted quality of service. In this example, a higher score may indicate a higher predicted quality of service, and may be associated with data that indicates better performance. In some embodiments, the packet duplication model is influenced by an overall calculated QoS, the value associated with each metric, and/or the score calculated for each metric. Specifically, in some examples, the packet duplication model is recalibrated to increase the overall calculated QoS and/or the calculated score by varying, for example, a packet duplication rate, interval, etc. Each time the packet duplication model is recalibrated, the scores for the non-static metrics may be recalculated and used to influence the next generation of the packet duplication model.

For example, as shown in table 401 of FIG. 4, the bandwidth of network (e.g., network 217) is associated with a weight of 15%. If the bandwidth of the network is equal to 128 kbps, a value of "1" will be assigned. If the bandwidth of the network is equal to 2 Mbps, a value of "2" will be assigned. If the bandwidth of the network is greater than 2 Mbps, a value of "3" will be assigned. Similarly, a network with more efficient types, lower jitter, lower latency, lower packet loss rate, and more reliable carriers also has better performance, and is also assigned a higher value. The combined weight of the network metrics (50%) also reflects that the network metrics exert a larger influence on the quality of multimedia service than other metrics, such as the device or server metrics.

Table 402 associates a set of device metrics with a weight and a set of possible values. A higher score is associated with an endpoint that offers better performance. For example, based on the determination that an Android operating system offers better performance than a Linux operating system, the Android operating system is associated with a higher value than the Linux system. Similarly, devices with more powerful central processing units (CPUs), and higher RAMs are associated with higher values than their weaker counterparts.

Table 403 associates the server metrics with a weight and possible values. For example, at the server, a weight of 15% is assigned to the choice of codec. As discussed before, the G.722 and G.711 codecs offer better audio quality but require lower computation power, and for this particular example, they are assigned a higher score than G.729. Also, choosing servers that are closer to the endpoints shortens the routing distance, and improves the latency of packet transmission. Therefore, routing a request to a local server may be assigned a higher score than a choice of routing the request to servers in other locations. Likewise, domestic calls may be associated with a higher value than international calls, which require transmission over larger distances.

Figure 5:
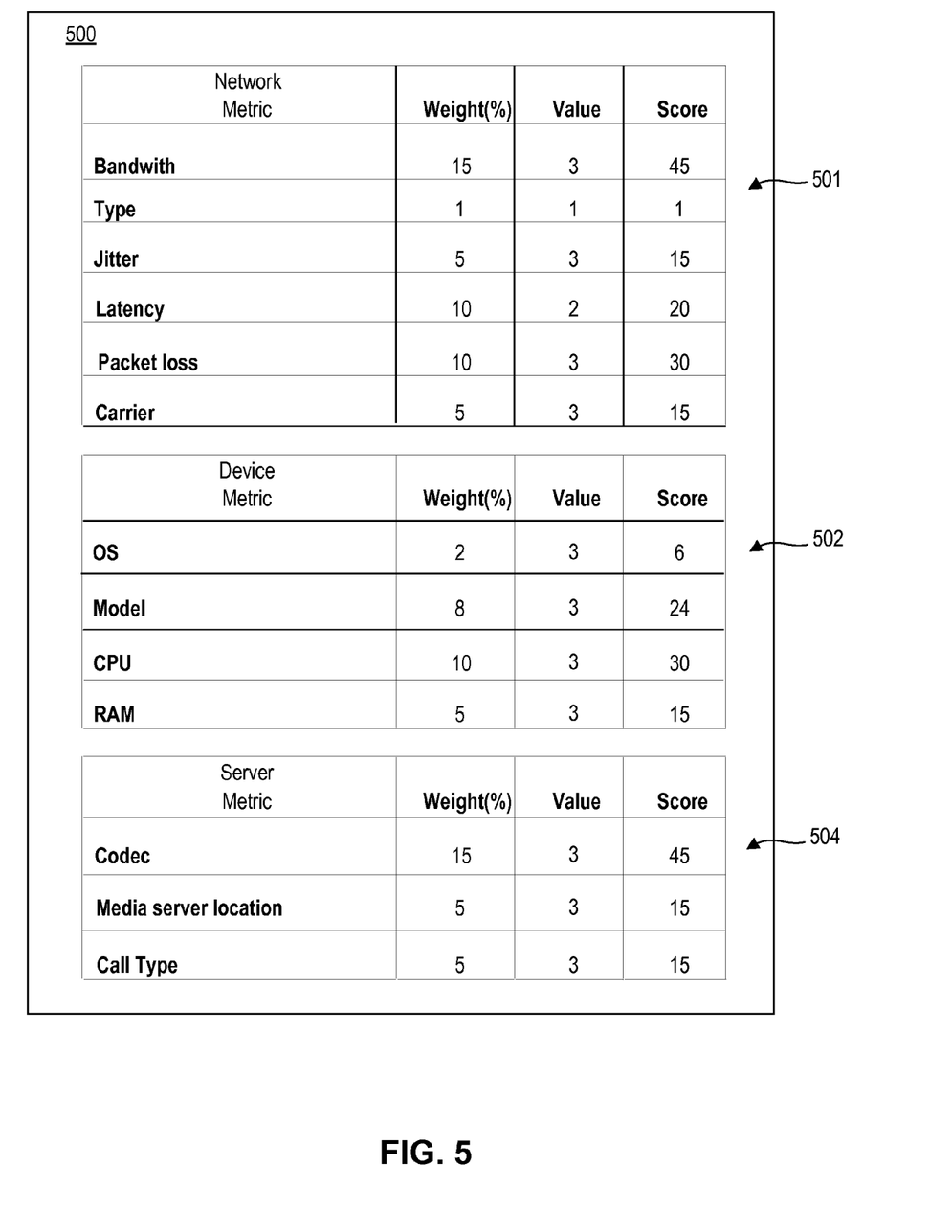
FIG. 5 is an example illustrating scoring at one example operational time point, consistent with disclosed embodiments.

FIG. 5 depicts a data structure 500 for storing descriptors of the set of metrics depicted in data structure 400, along with their associated weights and values at a given time period during a communication session, in accordance with a disclosed embodiment. In some embodiments, throughout a communication session, several data structures may be generated and stored or cached at several time periods and used in method 300 to influence the dynamic packet duplication model generation. Further, one or more data structures 400 and 500 may be selectively stored at one or more routers in the communication system 100 to facilitate the dynamic determination of the packet duplication rate since the data structures 400 and 500 may be used in the dynamic determination of the packet duplication rate.

In the illustrated data structure 500, a table 501 illustrates example values and scores for the network metrics at a given time point, a table 502 illustrates example values and scores for the device metrics at the given time point, and a table 503 illustrates example values and scores for the server metrics at the given time point. As shown, the score for each metric is calculated by multiplying the weight percent by the value for each metric. For example, in table 501, the bandwidth score is 45 based on a weight of 15% and a value of 3.

In some embodiments, the scores obtained in this manner are tallied to determine an overall QoS score at block 312. For instance, in data structure 500, the QoS score would be 276, which is a combination of all the calculated scores in tables 501-503. This QoS score may change throughout a communication session as the network, device, and/or server metric changes. These changes may be accounted for by the packet duplication method 300, however, in some embodiments method 300 continuously updates the packet duplication model throughout the communication session. For example, in some embodiments, the scores and/or the metric values is associated with a timestamp. A statistical representation (e.g., mean, median, etc.) of the scores and the costs may also be calculated with respect to a certain period of time (e.g., a predetermined portion of the call or video chat length), and the association among the statistical representation of the scores and costs and the configuration settings stored according to the period of time and used to update the packet duplication model. With such arrangements, a history of performance data, scores, values, and prior successful packet duplication models for certain circumstances are created and stored.

The example contents of tables 401-403 and 501-503 are provided for illustration purposes only, and do not limit the scope of the present disclosure. Further, in other embodiments, additional or fewer metrics may be provided. Also, the weight and/or possible values change, depending on implementation-specific considerations.

Figure 6:
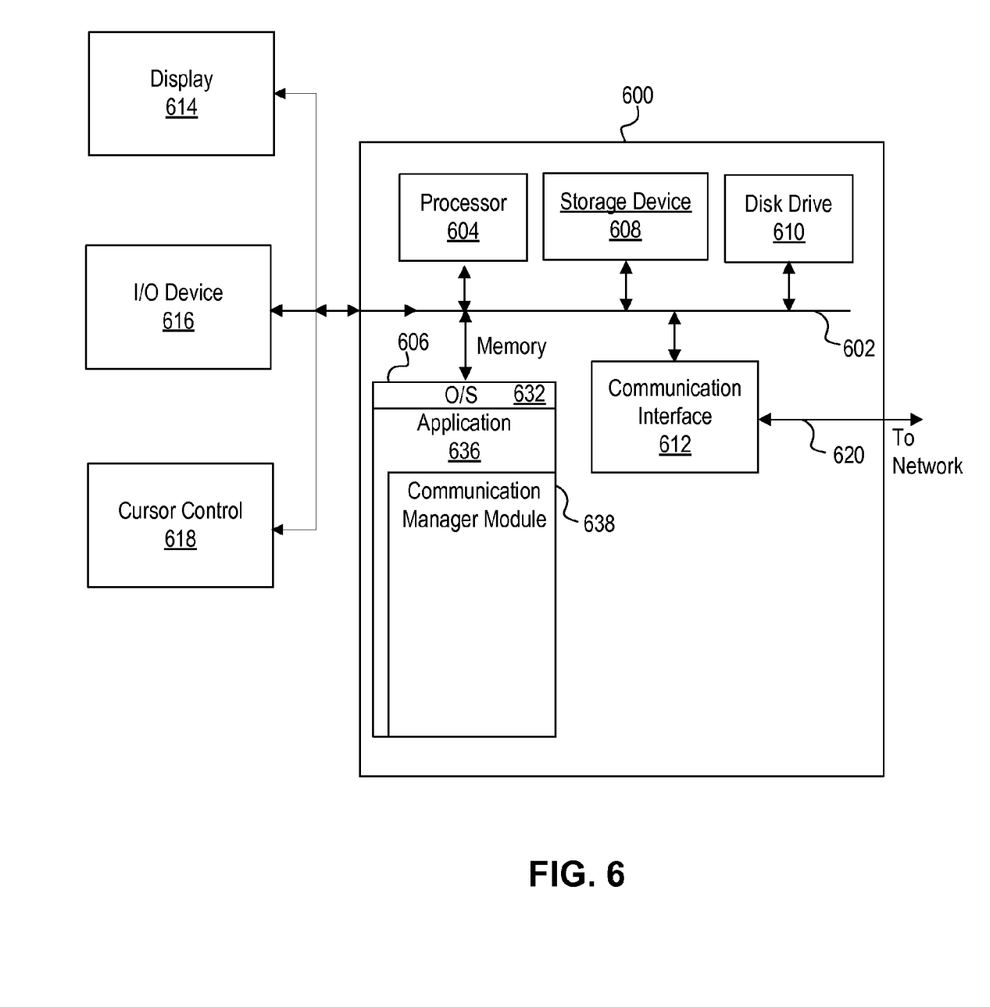
FIG. 6 is a diagram of an example system architecture for implementing embodiments consistent with the present disclosure.

FIG. 6 is a block diagram of an example system 600 that may be part of a communication device used in a communication system capable of functioning as any of the communication devices depicted in FIG. 2 (e.g., communication endpoints 243A-243F, communication servers 119a-119d, router 213A, etc.) and/or implementing the functionalities described above with respect to such devices. System 600 includes a bus 602 or other communication mechanism for communicating information. Bus 602 interconnects subsystems and devices, such as one or more processors 604, system memory ("memory") 606, storage device 608 (e.g., ROM), disk drive 610 (e.g., magnetic or optical), communication interface 612 (e.g., a modem, Ethernet card, or any other interface configured to exchange data with a communications network), display 614 (e.g., CRT or LCD), input device 616 (e.g., keyboard), and pointer cursor control 618 (e.g., mouse or trackball).

In some embodiments, system 600 performs specific operations in which processor 604 executes one or more sequences of one or more instructions stored in system memory 606. Such instructions can be read into system memory 606 from another computer readable medium, such as static storage device 608 or disk drive 610. In some examples, hard-wired circuitry can be used in place of or in combination with software instructions for implementation. In the example shown, system memory 606 includes modules of executable instructions for implementing an operation system ("O/S") 632, an application 636, and a communication manager module 638, which can provide the functionalities disclosed herein.

In some embodiments, execution of the sequences of instructions is performed by a single computer system 600. In other embodiments, two or more computer systems 600 coupled by communication link 620 (e.g., links to LAN, PSTN, or wireless network) perform the sequence of instructions in coordination with one another. Computer system 600 may transmit and receive messages, data, and instructions, including program code (i.e., application code) through communication link 620 and communication interface 612. Received program code may be executed by processor 604 as it is received, and stored in disk drive 610, or other non-volatile storage for later execution.

In some examples, where system 600 is part of the systems described above, storage device 608 stores data structures 400 and/or 500, and the associated network element configuration settings. Application 636 may receive a request for network resources for a communication session (e.g., an RTP session) via bus 602 and communication interface 612. If a participant to the communication session has subscribed to a certain quality of service for the session, application 636 determines a set of configuration settings expected to achieve the subscribed quality of service. Application 636 may also collect RTCP App packets via bus 602 and communication interface 612 to receive the packet duplication model for the given device at a given time point.

Figure 7:
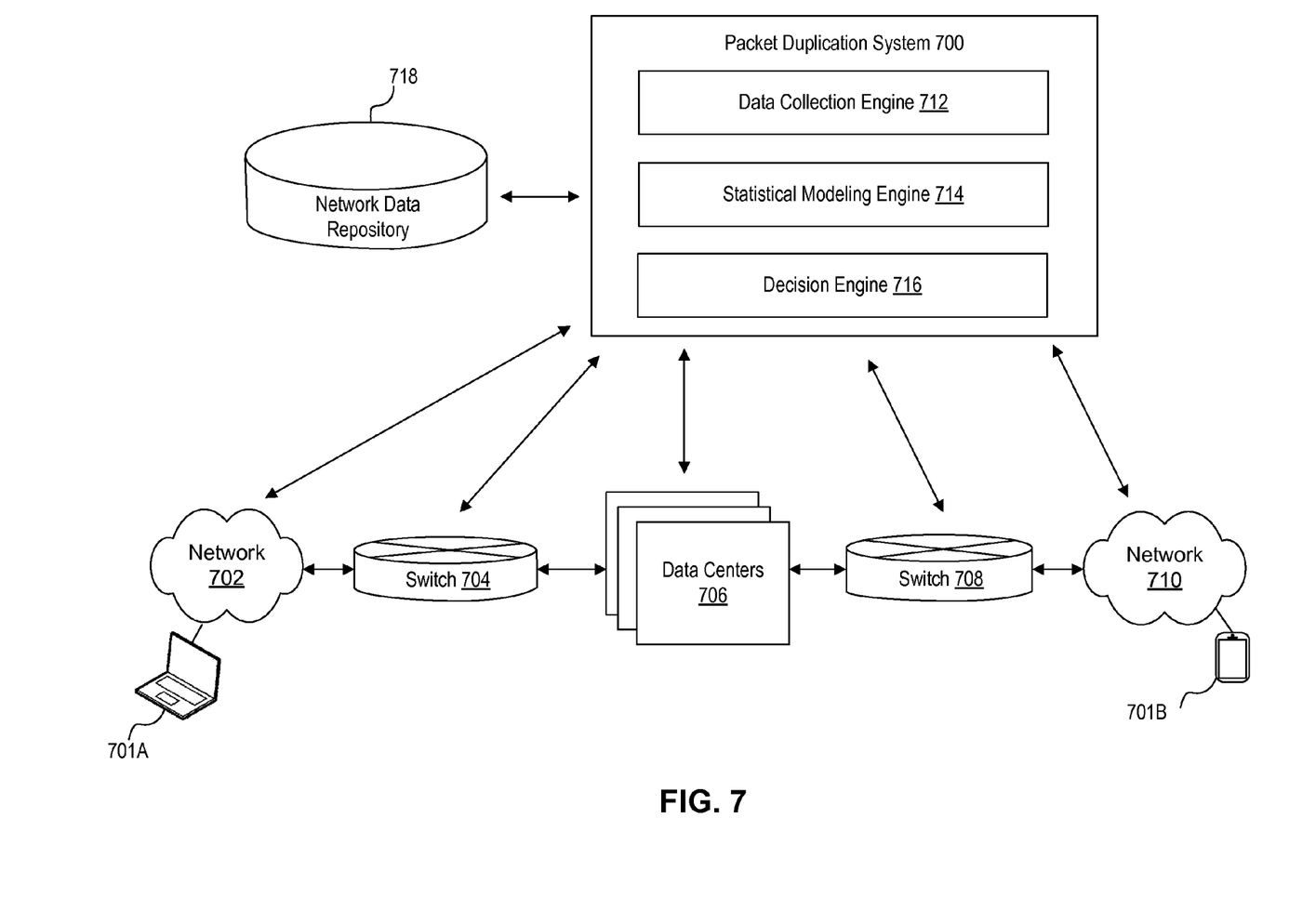
FIG. 7 is a component diagram of an example system environment for providing and managing network resources for multimedia service, consistent with disclosed embodiments.

FIG. 7 is a block diagram of an example system 700 for determining a packet duplication model, consistent with disclosed embodiments. As shown in FIG. 7, system 700 includes various network elements between communication endpoints 701A and 701B, including network 702, switch 704, data centers 706, switch 708, and network 710 that are communicatively coupled. Endpoints 701A and 701B may include any of the endpoints of FIG. 2. In a case where a VoIP session is established under RTP between endpoints 701A and 701B, network 702 is an IP network, while switch 704 include a session border control (SBC) and a SIP proxy and registrar. Switch 704 may be configured to route the media data to at least one of data centers 706, or to other data centers or to other network elements not shown in FIG. 7.

In some embodiments, data centers 706 include data centers 101 and/or 102 of FIG. 2, and may further include various communication servers configured to route and process the media data for the VoIP session. Switch 708 may include an interconnect SBC and a PSTN gateway configured to route the processed media data from data centers 706 to endpoint 701B via network 710, which may include a PSTN network. System 700 can be further configured to manage the configuration settings, such as the packet duplication models for the network elements of FIG. 7 to achieve a predetermined quality of service for the VoIP session.

As shown in FIG. 7, system 700 includes a data collection engine 712, a statistical modeling engine 714, and a decision engine 716, each of which may include a packaged functional hardware unit designed for use with other components or a part of a program that performs a particular function. Data collection engine 712 collects data during a communication session, such as the network, device, and server metrics discussed above, as well as the overall QoS score calculated for one or more time points during a communication session. The dynamic data provides statistical modeling engine 714, which can use previously-collected dynamic data from one or more prior sessions to construct a statistical model including various parameters for estimating the suitable packet duplication model for a given communication session. The statistical model may be updated over time as more sessions use method 300.

The dynamically acquired data metrics, as well as the statistical models, are provided to decision engine 716, which determines the appropriate packet duplication model, for example, in accordance with method 300, to transmit to communication endpoints 701A and 701B.

The dynamically acquired data, the statistical models, configuration settings, and/or determined packet duplication models are stored in a repository 718, which provides historical data to statistical modeling engine 714 for use in future communication sessions. In some embodiments, repository 518 may be organized with an Apache™ Hadoop® File System (HDFS).

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for facilitating communication sessions between endpoints, the method comprising:
    receiving, by at least one processor in one or more data centers, first data indicating that a communication session has been initiated between a plurality of endpoints;
    receiving, by the at least one processor, second data corresponding to application level metrics associated with the communication session, wherein the second data includes dynamic information;
    receiving, by the at least one processor, statistical modeling data from prior communication sessions; and
    determining, by the at least one processor, during the communication session, based on the second data and the statistical modeling data, a packet duplication model for transmitting data packets over one or more networks.

2. The computer-implemented method of claim 1, wherein the packet duplication model includes one or more changes to a prior packet duplication model used to communicate data packets between the plurality of endpoints.

3. The computer-implemented method of claim 1, further comprising:
    modifying the packet duplication model during the communication session based on a change to at least one of the application level metrics; and
    transmitting the modified packet duplication model to at least one of the plurality of endpoints, thereby dynamically changing a packet duplication rate during the communication session.

4. The computer-implemented method of claim 1, wherein the application level metrics are associated with at least one of network metrics, device metrics, and server metrics.

5. The computer-implemented method of claim 1, wherein the packet duplication model includes at least one of a packet duplication rate, packet duplication percent, and a packet duplication interval.

6. The computer-implemented method of claim 1, wherein the dynamic information includes at least one of a packet loss as observed from one of the plurality of endpoints, an inter-packet delay for the communication session, a percentage of packet loss during the communication session, and a number of packet drops during the communication session.

7. The computer-implemented method of claim 1, wherein the statistical modeling data includes statistical data from prior communication sessions, and historical data corresponding to past successful packet duplication models.

8. The computer-implemented method of claim 1, further comprising transmitting the packet duplication model to at least one of the plurality of endpoints using a real-time transport control protocol (RTCP).

9. The computer-implemented method of claim 1, further comprising assigning a weight and a value to each of the application level metrics.

10. The computer-implemented method of claim 9, further comprising:
    determining a quality of service (QoS) score based on the assigned weight and the assigned value for the each of the application level metrics; and
    determining, based on the second data and the QoS score, the packet duplication model.

11. The computer-implemented method of claim 1, wherein the at least one processor is physically distanced from each of the plurality of endpoints.

12. The computer-implemented method of claim 1, wherein determining the packet duplication model includes estimating a perceived quality for the communication session based on the application level metrics.

13. The computer-implemented method of claim 1, wherein the packet duplication model reflects a pre-determined quality associated with the communication session.

14. A system for facilitating communication sessions between endpoints, the system comprising:
    at least one memory device storing computer-executable instructions; and
    at least one processor in one or more data centers configured to execute the stored computer-executable instructions to:
    receive first data indicating that a communication session has been initiated between a plurality of endpoints;
    receive second data corresponding to application level metrics associated with the communication session, wherein the second data includes dynamic information;
    receive statistical modeling data from prior communication sessions; and
    determine, based on the second data and the statistical modeling data, a packet duplication model for transmitting data packets over one or more networks.

15. The system of claim 14, wherein the packet duplication model includes one or more changes to a prior packet duplication model used to communicate data packets between the plurality of endpoints.

16. The system of claim 14, wherein the at least one processor is further configured to execute the stored computer-executable instructions to:
    modify the packet duplication model during the communication session based on a change to at least one of the application level metrics; and
    transmit in real-time the modified packet duplication model to dynamically charge a packet duplication rate during the communication session.

17. The system of claim 14, wherein the statistical modeling data includes configuration settings, statistical data from prior communication sessions, and historical data corresponding to past successful packet duplication models.

18. The system of claim 14, wherein the dynamic information includes at least one of a packet loss observed for an endpoint, an inter-packet delay for the communication session, a percentage of packet loss during the communication session, and a number of packet drops during the communication session.

19. The system of claim 14, wherein one or more parameters defining a packet duplication model include at least one of a packet duplication rate, packet duplication percent, and a packet duplication interval.

20. The system of claim 14, wherein the second data includes information received from more than one layer of an open systems interconnection (OSI) layers.

21. The system of claim 14, wherein the at least one processor is further configured to execute the stored computer-executable instructions to assign a weight and a value to each of the application level metrics.

22. A non-transitory computer-readable medium storing instructions executable by at least one processor in one or more data centers to facilitate communication sessions between endpoints according to a method, the method comprising:

receiving first data indicating that a communication session has been initiated between a plurality of endpoints;

receiving, by the at least one processor, second data corresponding to application level metrics associated with the communication session, wherein the second data includes dynamic information;

receiving, by the at least one processor, statistical modeling data from prior communication sessions; and determining, based on the second data and the statistical modeling data, a packet duplication model for transmitting data packets over one or more networks.

23. The non-transitory computer-readable medium of claim 22, wherein the method further comprises:

modifying the packet duplication model during the communication session based on a change to at least one of the application level metrics; and transmitting in real-time the modified packet duplication model to at least one of the plurality of endpoints, thereby dynamically changing a packet duplication rate during the communication session.

* * * * *